United States Patent [19]

DellaVecchia et al.

[11] 4,269,884
[45] May 26, 1981

[54] FIBER REINFORCED MULTI-PLY STAMPABLE THERMOPLASTIC SHEET

[75] Inventors: Michael P. DellaVecchia, Sparta; Joseph E. Mackey, East Hanover; Albert H. Steinberg, Morris Plains, all of N.J.

[73] Assignee: Allied Chemical Corporation, Morris Township, Morris County, N.J.

[21] Appl. No.: 83,447

[22] Filed: Oct. 10, 1979

[51] Int. Cl.$^3$ ............................................. B32B 3/10
[52] U.S. Cl. ................................. 428/131; 156/219; 156/244.11; 156/244.12; 156/324; 156/303.1; 156/298; 428/137; 428/156; 428/240; 428/246; 428/247; 428/283; 428/284; 428/286; 428/287; 428/297; 428/298; 428/302; 428/303
[58] Field of Search ............... 428/156, 157, 246, 251, 428/283, 284, 286, 287, 295, 297, 298, 302, 409, 247, 323, 303; 156/244.12, 309, 324, 304, 244.11, 219

[56] References Cited

U.S. PATENT DOCUMENTS

| | | | |
|---|---|---|---|
| 4,044,188 | 8/1977 | Segal | 428/298 |
| 4,118,533 | 10/1978 | Hyschen et al. | 428/297 |
| 4,135,029 | 1/1979 | Pfiffer | 428/297 |
| 4,178,406 | 12/1979 | Russel | 428/297 |

Primary Examiner—James J. Bell
Attorney, Agent, or Firm—Richard A. Negin; Ernest D. Buff

[57] ABSTRACT

Reinforced thermoplastic polymer composite sheets, formable into smooth, shaped objects in a stamping process. The composite sheet is produced by laminating together (1) a first layer of thermoplastic resin containing short nonsiliceous fibers and a mineral filler such as kaolin, (2) a backing reinforcing layer comprising a long nonsiliceous fiber mat impregnated by thermoplastic resin and (3) optionally a third layer similar to said first layer. The long fiber mat is positioned within the reinforcing layer during impregnation, whereby the mat becomes encased in a resin matrix.

13 Claims, 6 Drawing Figures

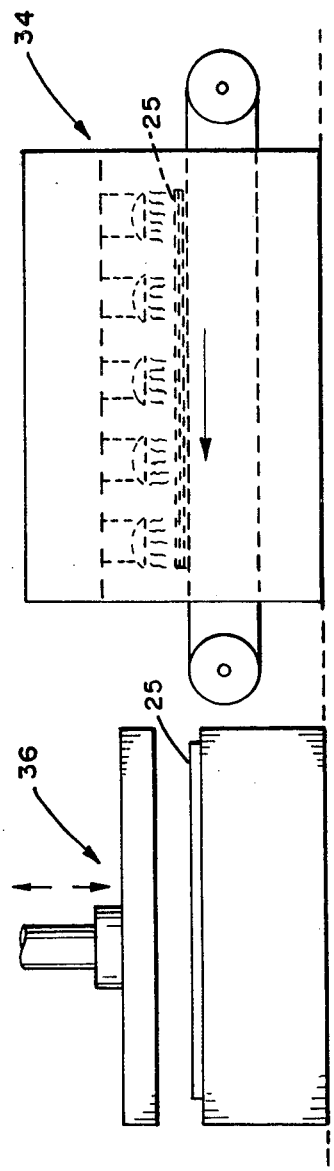
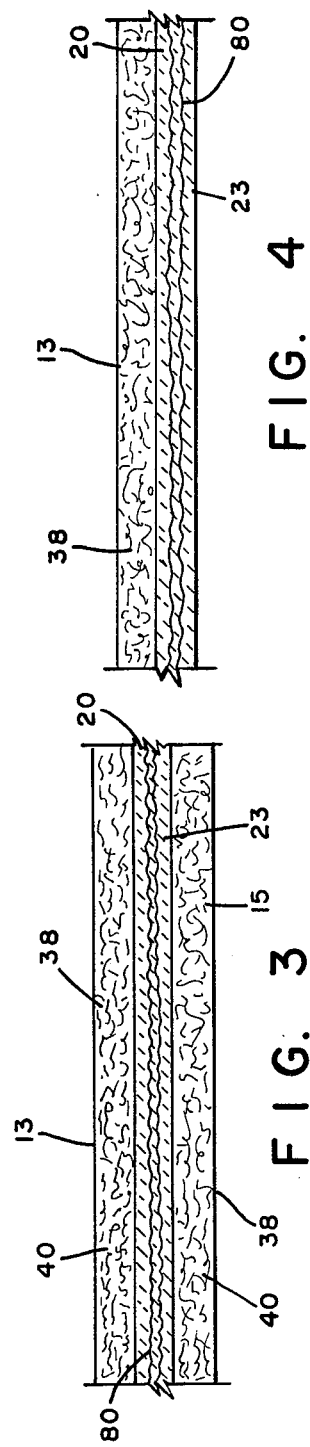

FIBER REINFORCED MULTI-PLY STAMPABLE THERMOPLASTIC SHEET

This invention relates to reinforced thermoplastic material and more specifically to apparatus and method for extruding a stampable, reinforced thermoplastic composite sheet containing, as reinforcement, a nonsiliceous fiber mat.

DESCRIPTION OF THE PRIOR ART

In the apparatus and method used to form stampable reinforced thermoplastic composite sheets, a long glass fiber mat is sandwiched between a glass fiber filled layer of thermoplastic resin and a fiber-free layer of the resin, and laminated into a multi-ply product while the fiber-free resin layer is in a molten condition.

One of the major problems with such systems is the difficulty of coating substantially all of the fibers of the mat during lamination. The problem is particularly troublesome when mats having a high concentration of glass fiber or utilizing chopped glass fiber strands are employed. In order to alleviate the problem of incomplete coating, it has often been necessary to reduce mat weight and filler concentration, increase resin quantity, utilize resin modifiers and decrease processing speeds. These constraints increase the cost and reduce performance characteristics of the laminated product.

SUMMARY OF THE INVENTION

The present invention provides a strong, light stampable thermoplastic sheet and a method and means for producing such sheet in an economical, reliable manner. The sheet comprises in terms of percent by weight of each layer (a) at least one layer comprising from about 40 percent to 100 percent of a synthetic thermoplastic polymer, about 0 percent to 50 percent of a particulate filler, and up to about 45 percent short nonsiliceous fibers having a length ranging from 0.01 to ¾ of an inch and arranged generally parallel to the plane of the sheet surface, (b) a reinforcing layer adjoining said one layer comprising 50 to 100 percent of synthetic thermoplastic polymer on an extruded basis, a long nonsiliceous fiber mat comprised of fibers having a length of at least 1 inch and having a weight ranging from 0.1 to 16 ounces per square foot of mat surface area and particulate fillers ranging on an extruded basis from 0 percent to 50 percent, and (c) mat positioning means disposed between said at least one layer and said mat, for holding said mat within reinforcing layer during formation of said composite, said mat being substantially encased in a matrix of the thermoplastic polymer.

In addition, the present invention provides a process for making composite laminated sheet comprising the steps of (a) blending and extruding a first sheet layer comprising from about 40 percent to 100 percent of thermoplastic polymer, about 0 percent to 50 percent of a particulate filler and up to about 45 percent short nonsiliceous fibers having a length ranging from 0.01 to ¾ of an inch and arranged in a plane generally parallel to the sheet surface, (b) embossing said first sheet layer to form an embossed surface thereon containing a plurality of projections, (c) blending and extruding a second sheet layer comprising from about 50 percent to 100 percent of synthetic thermoplastic polymer and from 0 percent to 50 percent particulate filler, (d) feeding said first sheet, said second sheet and a long nonsiliceous fiber mat, the fibers of which have a length of at least 1 inch, into the nip of a set of laminating rolls while the resin of the second sheet is steill in a molten condition, the clearance between the rolls being less than the thickness of the sheets and fiber mat being fed to the nip of said rolls, whereby the long fiber mat is positioned within said second sheet during impregnation of said mat thereby and said first and second sheets are laminated into a smooth multi-ply product.

BRIEF DESCRIPTION OF THE DRAWINGS

The invention will be more fully understood and further advantages will become apparent when reference is made to the following detailed description and the accompanying drawings in which:

FIG. 2 illustrates a stamping press for the sheets of this invention;

FIG. 3 illustrates a schematic cross section of a composite sheet of this invention;

FIG. 4 illustrates an alternate construction of the sheet shown in FIG. 3;

DESCRIPTION OF THE PREFERRED EMBODIMENT

Figure 1:
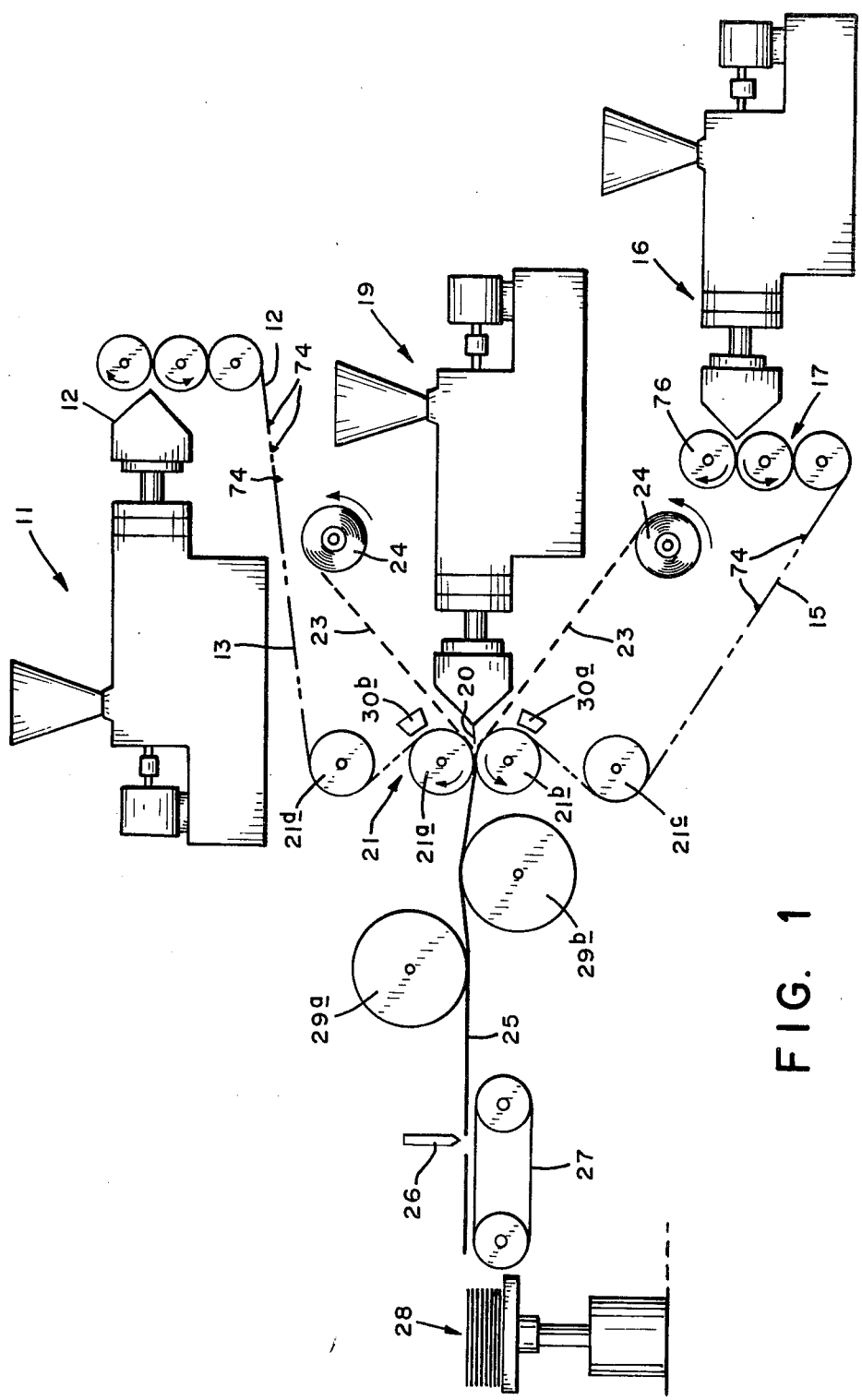
FIG. 1 illustrates schematically a system for producing composite sheets of this invention.

Referring to the drawings, a first extruder 11 receives a mixture of thermoplastic resin such as nylon, short nonsiliceous fibers and particulate filler and extrudes same through a die 12 to produce a filled sheet 13 which is embossed by roller 70 of stack 14 so as to form an embossed surface 72 thereon containing a plurality of projections 74. A similar thermoplastic sheet 15 is produced from extruder 16 and embossed in similar fashion by roller 76 of stack 17. A third extruder 19 feeds a thermoplastic sheet 20 into laminating rolls 21 simulataneously with sheets 13 and 15, and long fiber mat or mats 23 which are fed from roll or rolls 24. It is important that the sheet 20 be in a molten condition at the point where the sheets converge on the rolls 21 and that the sheets 13 and 15 be below the melting point of the polymer so that projections 74 position the fiber mat or mats 23 within the molten sheet 20 during impregnation of the mat(s) 23 by the sheet 20. In this manner, the long fiber reinforcing mat becomes substantially encased in the sheet 20 and does not affect surface qualities of sheets 13 and 15 when they are laminted together. The sheet is subsequently cut with cutter mechanism 26 and/or slit longitudinally in a conventional manner by means of a slitter mechanism (not shown) on conveyor 27 and fed to stacking table 28.

An important feature of this embodiment of the method is the processing condition at the roll stack 21.

The clearance between rolls 21(a) and 21(b) is less than the combined thickness of the four components 13, 15, 20 and 23. (Thickness of mat 23 is measured under little or no compression.) This is necessary to effect an impregnation of mat 23 by sheet 20, and lamination of the resulting product to sheets 13 and 15.

The temperature of the sheet 20 should be above (at least 10° C. above) the thermoplastic melting point to provide adequate residual heat to allow the fiber mat to be uniformly impregnated after cooling of sheet 20 between the extruder die 30 and the roll stack 21. Preferably, the sheet is 50° C. to 100° C. above the polymer melting point at the point of convergence between rolls 21(a) and 21(b). Heating the sheet to a temperature higher than 350° C. in the extruder may cause degradation of the polymer and results in excessive energy consumption. Lower temperatures result in inadequate impregnation of the mat 23 by sheet 20, includng inadequate flow of the polymer into the interstices of the fiber mat, inadequate bonding of sheets 13 and 15 to sheet 20, and inadequate binding of the fibers to the polymer resulting in poor physical properties in the final product.

For the same reasons, the pressure applied by rolls 21(a) and 21(b) should range from 100 to 1500 pounds per linear inch, and preferably from 150 to 400 pounds per linear inch, to ensure adequate bonding of the layers and impregnation of the fiber mat 23 by sheet 20. Rolls 21(a) and 21(b) must have adequate diameter and wall thickness and bearings of sufficient load bearing capacity to prevent excessive deflection of rolls (21(a) and 21(b). Excessive deflection of rolls 21(a) and 21(b), that is deflection of the order of about 2 thousandths inch or more, can result in nonuniform impregnation of fiber mat 23 by sheet 20, nonuniform bonding of sheets 13 and 15 to sheet 20, nonuniform surface appearance, and nonuniform thickness of sheet 25.

Sheet 13 after leaving embossing stack 14 contacts roll 21(d) and then roll 21(a). Sheet 15, after leaving embossing stack 17 contacts roll 21(c) and then roll 21(b). Rolls 21(c) and 21(d) are maintained at a temperature close to but below the polymer melting point, preferably 5° C. to 40° C. below the polymer melting point. Rolls 21(a) and 21(b) are maintained at a temperature 10° C. to 70° C below the polymer melting point. The temperatures of rolls 21(a), 21(b), 21(c) and 21(d) and infrared heaters 30(a), 30(b) are adjusted so that the temperature of sheets 13 and 15 is high enough to achieve strong bonding of sheets 13 and 15 to sheet 20, but not so high as to result in sticking of sheet 13 to roll 21(d) or 21(c) or of sheet 15 to roll 21(a) or 21(b), softening of projections 74 or degradation of the quality of sheet 25.

Cooling rolls, such as rolls 29(a) and 29(b), can be used to quickly lower the temperature of laminate 25 sufficiently for easy cutting on cutter mechanism 26.

Figure 5:
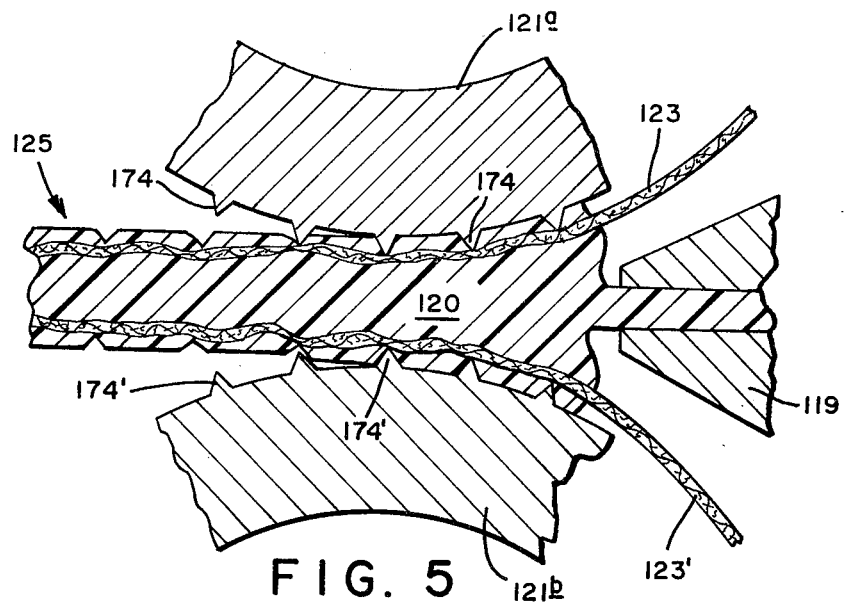
FIG. 5 illustrates an alternate embodiment of the invention.

An alternate embodiment, illustrated in FIG. 5, would have the fiber mat 123 impregnated by sheet 120 in a separate operation. Under these circumstances the roll 121(a) is provided with a plurality of projections 174 for positioning the mat 123 within sheet 120 during impregnation of the mat 123 by the sheet 120. The ends of the projections force the mat 123 into the sheet 120, causing molten portions of the sheet 120 from extruder 119 to flow within passageways formed by adjacent projections to encompass the mat 123. The projections thus position the mat centrally of the sheet 120 and hold it therewithin, facilitating coating of the mat 123 by the sheet during impregnation. The impregnated mat 125 thus produced can be used in a stamping operation or laminated to sheet(s) 13, 15 as described hereinafter in more detail. Further, a plurality of embossing rolls 121(a) and 121(b ) can be employed, the roll 121(b) being provided with a plurality of projections 174' similar to projections 174 of roll 121(a), for positioning mat 123' in sheet 120.

Mat positioning may also be accomplished by means of a screen 80, shown in FIGS. 3 and 4, interposed between sheet 13 and mat 23 prior to lamination, the strands of the screen 80 forming projections and the openings thereof forming passageways that function in substantiallythe same way as the projections and passageways of sheets 13, 15 or roll 21(a). The screen 80 facilitates impregnation of mat 23 by melt 20 and provides a further reinforcing means for the composite sheet. Typically, the screen 80 has a mesh size ranging from about 1 inch to No. 8 U.S. Sieve Size, and is composed of metal, plastic, fibrous material such as glass, graphite, cotton, nylon, polyester, cellulose acetate or the like. As used herein, the term screen is intended to include such mat positioning means as a perforated plate, expanded metal sheet, scrim and the like.

Whether the projections are located on the sheets 13, 15 or on the roll 21(a), their number and configuration will vary depending on such processing parameters as mat density, filler concentration, laminating time and temperature and the like. Typically, the projections are cone-shaped members having a height of about 0.01 to 0.1 inch and a base perimeter of about 0.2 to 0.8 inch, and either randomly or regularly spaced about 0.06 to 1 inch apart over substantially the entire area of the mat contacting surface of the sheet or laminating roll employed. The projections can, alternatively, be shaped in the form of a pyramid, cylinder, cube, or the like of regular or irregular configuration arranged to form a regular pattern or an irregular pattern such as a doodle or the like.

Following impregnation of fiber mat 123 by sheet 120 in a separate operation, the combined sheet 125 can be laminated to sheet 13, or to sheets 13 and 15 in a laminating process wherein the layers are bonded under heat and pressure. Lamination of the combined sheet 125 to sheet 13 or to sheets 13 and 15 may also be effected during the heating and stamping operation wherein different laminates are assembled depending on the part to be produced. An example of the latter method is shown in FIG. 2. A sandwich 25 built from layers 13, 15 and combined sheet 125 is heated in oven 34. This heating step serves to condition the sheets for stamping in press 36 and also to effect a slight bnd between the layer interfaces. The subsequent pressure in press 36 has the effect of simultaneously laminating the mat containing sheet 125 to sheets 13, 15 and forming the resulting composite into a part.

A composite sheet typically produced is illustrated in FIG. 3. It comprises: (a) one or more surface layers containing 40 percent to 100 percent polymer, up to 45 percent of well-dispersed, randomly oriented, short nonsiliceous fibers and 0 percent to 50 percent particulate filler, (b) a reinforcing layer consisting essentially of long nonsiliceous reinforcing mat weighing 0.1 to 16 ounces per square foot, together with the mat positioning means herein shown in the form of a screen 80, encased in a thermoplastic polymer matrix containing, on an extruded basis, from 50 percent to 100 percent thermoplastic resin and from 0 percent to 50 percent particulate filler, such that there is essentially no migration of the long fibers to the surface layer 13 and no migration of the short fibers, if present, to the reinforcing layer, shown generally at 70.

The stampable composite sheet may have one or two defect-free surfaces. The short, well-dispersed fibers 38, if present, are randomly but predominately two-dimensionally oriented in the plane of the sheets 13 and 15. That is, more than 50 percent of the fibers are aligned substantially parallel to the plane of the sheet. Such orientation of the short fiber is easily achieved in extrusion, rolling, drawing or similar orientation-inducing processes, and is preferable for purposes of this invention in achieving smooth-surfaced sheets.

Figure 6:
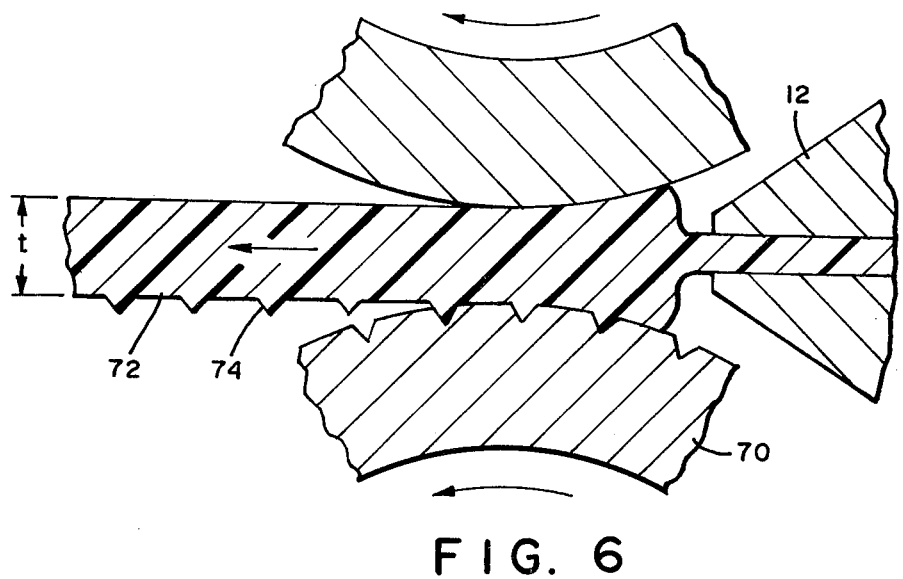
FIG. 6 is a sectional view illustrating means for embossing an extruded thermoplastic sheet used to form the composite sheets of this invention.

As shown in FIG. 6, the thickness, t, of the surface sheet should be at least 10 mils to prevent tearing during lamination. Typically, the surface sheet 13 has a thickness of at least 20 mils. A thinner surface sheet may also permit the patern of the reinforcing mat 23 to be visible on the surface of the composite sheet 25. The thickness of sheet 20 is determined by the need to impregnate fiber mat 23 and is typically about 30–80 mils. If thickness of sheet 20 is less than about 30 mils, then fiber mat 23 is likely to be nonuniformly impregnated into sheet 20 and composite sheet 25 is likely to have nonuniform properties.

The thermoplastic polymers which can be used in forming the sheet compositions which may be stamped into shaped objects in accordance with the methods of the present invention include the various thermoplastic materials normally used in injection molding, extrusion, vacuum forming, blow molding, fiber spinning, or similar thermoplastic processing techniques.

Suitable thermoplastic resinous materials which may be utilized in making the composite laminate of the invention include, for example, the alkenyl aromatic resins typified by polystryrene, styrene copolymers, blends and graft copolymers of styrene and rubber and the like. The invention may be practiced utilizing polyvinyl chloride or copolymers of vinyl chloride or vinylidene chloride.

Particularly desirable thermoplastics in such compositions are the polyamides, that is, polymers having regularly recurring amide groups as an integral part of the main groups as an integral part of the main chain. Polyamides such as nylon 6,6 (a condensation product of hexamethylene diamine and adipic acid) and nylon 6 (the polymerization product of ε-aminocaproic acid or caprolactam) are examples of two polyamides or nylons.

Polyolefins may also be employed, including polymers and copolymers of ethylene, propylene, methylpentene and blends thereof.

Additional polymers which can be utilized incude polyurethane, polysulfone, polycarbonte and linear polyesters such as polyethylene terephthalate and polybutylene terephthalate; cellulose esters such as cellulose acetate, and cellulose propionate; halongenated polyolefins and polyacetals.

Also included in the term "polymer" are blends or copolymers of two or more polymeric materials. Illustrative of such polymers are polyethylene/polypropylene, ethylene-acrylic acid-vinylacetate terpolymers and the like.

The nonsiliceous fiber used in making the fiber mat is preferably used in the form of strands or bundles which are at least about 1 inch to continuous in length. The reinforcing mat may be woven or nonwoven. The strands or fiber comprising the reinforcing mat, if nonwoven, are held together either by resinous adhesive binders (thermosetting or thermoplastic resins) or by "needling" or, if woven, by the mechanical interaction of the randomly patterned weblike structure.

The individual fiber strands in the mat are comprised of about 2 to 400, preferably 5 to 120, filaments per strand. Each filament is about 0.00020 to about 0.001 inch, preferably 0.00025 to 0.00085 inch in diameter. The fibermat comprising the reinforcing phase may have a weight of from 0.3 to 16 ounces per square foot.

The nonsiliceous fibers may optionally be treated with various coupling agents or adhesion promoters as is known in the art.

The short nonsiliceous fiber reinforcement is at least about 0.01 inch in average length in the final product. These short lengths of fibrous reinforcement are often obtained because of the characteristics of the processing apparatus used to compound or blend this reinforcement with the thermoplastic resin. For example, if fibers ⅛ inch or longer are placed in the feed hopper of a single screw extruder along with the resin, the fibers are oftentimes broken down into lengths shorter than the original ⅛ inch starting length because of abrasion, shear, turbulence and mechanical work performed upon the fibers. Longerlengths (e.g., means lengths longer than 0.010 inch in a major portion of the short fiber reinforcement) may be retained by minimizing the amount of shear or mechanical breakdown of fiber length, with possibly some sacrifice in homogeneity or prolonged processing times although lenghts greater than ⅜ inch are not desirable for the object of the invention since they must flow into ribs, etc. during stamping. Such longer fiber lengths may also be obtained by proper selection of the fiber. Another processing machine which may be used to blend and/or manufacture the short fiber-filled resinous sheet is a twin screw extruder. In this case, the filamentary reinforcing material may be added to agitated heat plastified polymer between the screws of the extruder through a feed port such as a volatile (vent) port. In the latter case, the filamentary reinforcing material may be fed to the twin screw extruder in the form of yarn or roving, and the short fiber lengths would be obtained by the mechanical breakup performed by the mixing action of the screws.

Another constituent of the improved thermoplastic sheet material herein described is particulate filler. Such fillers may be selected from a wide variety of minerals, metals, metal oxides, siliceous materials, metal salts, and mixtures thereof. These fillers may optionally be treated with various coupling agents or adhesion promoters, as is known to those skilled in the art. Advantageous physical properties are achieved if the filler material has a Young's modulus of $10^7$ psi or greater and at least a Young's modulus twice as great as that of the polymer. Examples of fillers included in these categories are alumina, aluminum hydrates, feldspar, asbestos, talc, calcium carbonates, clay, carbon black, quartz, novaculite and other forms of silica, kaolinite, bentonite, garnet, mica, saponite, beidellite, calcium oxide, calcium hydroxide, etc. The foregoing recited fillers are illustrative only and are not meant to limit the scope of fillers that can be utilized in this invention.

The particulate filler may be added to the thermoplastic resin before, during, or after the addition of the short fibers to the resin. Thus, for example, filler and resin pellets may be fed to the feed hopper of a single screw extruder; the mixture is blended and conveyed towards the die. Short fibers can be added to the molten mixture at a vent hole or other such opening downstream of the feed hopper, and the mixture then extruded into pellets, or preferably, directly into sheet of the appropriate thickness for lamination with the fiber mat reinforcement. In the extrusion process, the short fibers will emerge oriented in the plane of the extruded sheet.

Other minor additives which may be of value in sheet formulations include antistatic agents, plasticizers, lubricants, nucleating agents, impact modifiers, colorants, heat and light stabilizers, or other similar processing aids and adjuvants.

Each of the foregoing constituents performs a specific function within the composite material. The thermoplastic resin is, of course, the matrix which binds the other constituents together. As the matrix, the resin influences the mechanical and physical properties of the composite sheet. If a stamped product having an extremely high thermal resistance is required, for example, a nylon or linear polyester would be utilized as the matrix rather than polyethylene or polypropylene.

With sheets formed of nylon 6 resin, it is preferred to utilize a nucleating agent for the nylon. Talc is the preferred nucleating agent. For this purpose about 0.5 percent to 1.5 percent or more talc by weight of the nylon is incorporated into the sheet. Preferably, the sheet contains about 1 percent talc based on the weight of the nylon. Talc or other nucleating agents may alternatively be employed in similar amounts with nylon or other crystalline polymers.

While composites without filler may be formed, the most desirable sheets include filler.

The functions of the particulate filler are: (1) to increase the modulus and stiffness of the composite sheet and (2) to provide a more economical composition.

The functions of the short fiber reinforcement are: (1) to increase the sheet stiffness and mechanical strength, (2) to increase the resin-phase melt viscosity, (3) to provide reinforcement in addition to that provided by the long fiber mat, (4) to allow flow of a reinforced plastic mixture into small holes, bosses, ribs, apertures, etc., during stamping and (5) to yield an improved surface in which most short dispersed fibers are oriented and lie in the plane of the sheet. In addition to the ability to form relatively narrow reinforced ribs, bosses, or similar sections, because of flow of short fibers into such sections, the high melt viscosity of the resin-filler-short fiber mixture aids in promoting uniformity of properties. Furthermore, because of the generally enhanced moldability of the present compostions, longer, thinner and more complex configurations or parts can be molded than heretofore known.

The short fibers oriented parallel to the plane of the sheet (in distinction to perpendicular to the plane of the sheet) result in a smooth surface free of glass mat and projecting fiber ends.

The present invention is more particularly described in the following examples which are intended as illustrative only since numerous modifications and variations therein will be apparent to those skilled in the art.

Shaping of the sheet can be accomplished in a deep drawing press which has a polished steel die-set to produce 5-inch diameter cylindrical cups. The temperature of the polished steel die-set can be adjusted by means of electric heaters, and maintained at approximately 140° C. The steel molds used are highly polished and chrome-plated (mirror finished).

The preheated sheet can be transferred to the stamping press, and stamped at a pressure of 800 psi maintained for 10 seconds. The stamped part can be cooled to room temperature, maintained at room temperature for 24 hours, and the flat bottom of the cup then cut out for surface roughness testing.

The process of the present invention can be practiced using a wide variety of nonsiliceous fibers, such as nonsiliceous fibers composed of inorganic or organic materials having a melting point higher than that of the thermoplastic resin. Nonsiliceous fibers suited for use herein include those composed of asbestos, carbon, graphite, boron, cellulose, titanates, polyesters, polyamides, aramids, acrylics, metallics, amorphous metals such as those sold under the trademark, METGLAS ®, by Allied Chemical Corporation, mixtures thereof and the like.

Further, it is within the ambit of the present invention to combine siliceous fibers with said non-siliceous fibers and nonsiliceous fiber mixtures. Typically, such amounts of siliceous fiber range up to about 90 percent, and preferably from about 50 percent to 80 percent by weight of the combined fiber mixture. Siliceous fibers suitable for use in the present invention include glass and quartz fiber and mixtures thereof. Still further, such siliceous fibers can be used to form a portion of at least one of a plurality of mats comprising the nonsiliceous fiber layers as in the order of up to about 100 percent and preferably about 50 percent to 80 percent by weight thereof.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

Nylon 6 resin is blended with 25 percent short graphite fibers and 15 percent kaolin in extruder 11 and extruded into sheet 13. A sheet 15 of the above composition is extruded by extruder 16. Sheets 13, 15 are embossed by rolls 70, 76 to provide each of the sheets with a mat contacting surface having a plurality of projections 74. Both sheets 13, 15 are brought together with graphite fiber mats 23 and molten sheet 20 at the nip of laminating rolls 21(a), 21(b). The mats 23 are positioned within sheet 20 by projections 74 to form a middle reinforcing sheet comprising 75 percent nylon and 25 percent graphite mat. The resulting sandwich is laminated and finished in the nip of rolls 21(a), 21(b) and on rolls 29(a), 29(b). The resulting sheet is cut into discrete blanks and stored.

EXAMPLE 2

Nylon 6 is blended with 30 percent short glass fibers, 19 percent glass beads, 1 percent talc, 0.5 percent carbon black and 0.1 heat stabilizer composed of 0.14 percent cupric chloride and 0.007 percent potassium iodide. Sheets 13 and 15 of the above composition are extruded by extruders 11 and 16.

Each of the extruders 11, 16 is operated to produce a flat sheet measuring 0.150 inch at the lips of the sheet die. Extruder barrel temperatures range from 500° F. at the first heating zone upward to 540°–570° F. at the exit zone. Die temperatures range from 520°–550° F.

Sheets 13, 15 are embossed by rolls 70, 76 to provide each of the sheets with a mat contacting surface having a plurality of projections 74. Sheet 13 is brought together with graphite fiber mat 23 and molten sheet 20 at the nip of laminating rolls 21(a), 21(b). Molten sheet 20 is composed of nylon 6 blended with 29 percent glass beads, 1 percent talc, 0.5 percent carbon black, 0.2 percent potassium iodide and 0.01 percent cupric chloride. The mat 23 is positioned within sheet 20 by projections 74 to form a middle reinforcing sheet. Mat 23 has a weight of 0.95 ounces per square foot. The resulting sandwich is laminated and finished in the nip of rolls 21(a), 21(b) and on rolls 29(a), 29(b). The resulting sheet is cut into discrete blanks and stored. The resulting sheet has a flexural modulus of 981,000 psi and a flexural strength of 23,820 psi.

Having thus described the invention in rather full detail, it will be apparent that these details need not be fully adhered to but that various changes and modifications may suggest themselves to one skilled in the art, all falling within the scope of the invention as defined by the subjoined claims.

We claim:

1. A thermoplastic composite, laminated sheet comprising, in terms of percent by weight of each layer: (a) at least one layer comprising from about 40 percent to 100 percent of a synthetic thermoplastic polymer, about 0 percent to 50 percent of a particulate filler, and up to about 45 percent short nonsiliceous fibers having a length ranging from 0.01 to ¾ of an inch and arranged generally parallel to the plane of the sheet surface, (b) a reinforcing layer adjoining said one layer comprising 50 percent to 100 percent of synthetic thermoplastic polymer on an extruded basis, a long nonsiliceous fiber mat comprised of fibers having a length of at least 1 inch and having a weight ranging from 0.5 to 16 ounces per square foot, particulate filler ranging from 0 percent to 50 percent on an extruded basis and (c) mat positioning means disposed between said at least one layer and said mat, for holding said mat within said reinforcing layer during formation of said composite, said mat being substantially encased in a matrix of the thermoplastic polymer.

2. A thermoplastic composite as recited in claim 1, wherein said mat positioning means comprises a plurality of projections integral with said at least one layer.

3. A thermoplastic composite as recited in claim 1, wherein said mat positioning means is a screen having a mesh size ranging from about 1 to No. 8 U.S. Sieve Size.

4. A process for producing a composite laminated sheet comprising the steps of:
(a) extruding a first sheet layer comprising from about 40 percent to 100 percent of thermoplastic polymer, about 0 percent to 50 percent of a particulate filler and up to about 45 percent short nonsiliceous fibers having a length ranging from 0.01 to ¾ of an inch and arranged in a plane generally parallel to the sheet surface;
(b) embossing said first sheet layer in a roll stack to form an embossed surface thereon containing a plurality of projections;
(c) extruding a second sheet layer comprising from about 50 percent to 100 percent of synthetic thermoplastic polymer and from 0 percent to 50 percent particulate filler;
(d) feeding said first sheet, said second sheet and a long nonsiliceous fiber mat, the fibers of which have a length of at least 1 inch, into the nip of a set of laminating rolls while the resin of the second sheet is still in a molten condition, the clearance between the rolls being less than the thickness of the sheets and fiber mat being fed to the nip of said rolls, whereby the long fiber mat is positioned within said second sheet during impregnation of said mat thereby and said first and second sheets are laminated into a smooth multi-ply product.

5. A process as recited in claim 4, wherein said projections are regularly positioned on said embossed surface.

6. A process as recited in claim 4, wherein each of said projections has a height ranging from about 0.01 to 0.01 inch.

7. A process as recited in claim 4, wherein the distance between adjacent projections ranges from about 0.06 to 1 inch.

8. A process as recited in claim 4, wherein a roll of said stack has an embossing surface provided with a plurality of indentations.

9. The process of claim 4, wherein said first sheet layer has a fiber content 50-80 percent by weight of which is siliceous.

10. The process of claim 4, wherein said mat is comprised of a plurality of mats, at least one of which contains about 50-80 percent by weight siliceous fiber.

11. A process for producing a composite laminated sheet comprising the steps of:
(a) extruding a sheet layer comprising from about 50 percent to 100 percent of synthetic thermoplastic polymer and from 0 percent to 50 percent particulate filler;
(b) feeding said sheet and a long nonsiliceous fiber mat, the fibers of which have a length of at least 1 inch, into the nip of a set of laminating rolls while the resin of the sheet is still in a molten condition, the clearance between the rolls being less than the thickness of the sheets and fiber mat being fed to the nip of said rolls;
(c) positioning said long fiber mat within said sheet during impregnation of said mat, whereby said sheet and mat are laminated into a smooth multi-ply product.

12. A process as recited in claim 11, wherein one of said laminating rolls has a mat contacting surface provided with a plurality of projections, said mat being positioned within said second sheet by the ends of said projections.

13. A process as recited in claim 12, wherein the ends of said projections have reduced configurations.

* * * * *

UNITED STATES PATENT AND TRADEMARK OFFICE
CERTIFICATE OF CORRECTION

PATENT NO. : 4,269,884
DATED : May 26, 1981
INVENTOR(S) : Joseph E. Mackey, Michael P. DellaVecchia, Albert H. Steinberg It is certified that error appears in the above-identified patent and that said Letters Patent are hereby corrected as shown below:

Column 1, line 42, "50 to 100" should read --50 percent to 100--

Column 2, line 2, "steill" should be --still--.

Column 4, line 41, "bnd" should be --bond--.

Column 5, line 8, "patern" should be --pattern--.

line 43, "incude" should be --include--.

line 44, "polycarbonte" should be --polycarbonate--.

line 47, "halongenated" should be --halogenated--.

line 67, "fibermat" should be --fiber mat--.

Column 6, line 15, "Longerlengths" should be --Longer lengths--.

Column 10, line 17, "0.01" should be --0.1--.

Signed and Sealed this

Eighteenth Day of August 1981

[SEAL]

Attest:

GERALD J. MOSSINGHOFF

Attesting Officer

Commissioner of Patents and Trademarks